United States Patent
Cha et al.

(10) Patent No.: US 11,776,747 B2
(45) Date of Patent: Oct. 3, 2023

(54) MULTILAYER CERAMIC CAPACITOR

(71) Applicant: SAMSUNG ELECTRO-MECHANICS CO., LTD., Suwon-si (KR)

(72) Inventors: Berm Ha Cha, Suwon-si (KR); Soo Kyong Jo, Suwon-si (KR); Hwi Dae Kim, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/748,273

(22) Filed: May 19, 2022

(65) Prior Publication Data
US 2022/0277898 A1 Sep. 1, 2022

Related U.S. Application Data

(63) Continuation of application No. 17/093,968, filed on Nov. 10, 2020, now Pat. No. 11,367,570, which is a
(Continued)

(30) Foreign Application Priority Data

Dec. 7, 2017 (KR) .......................... 10-2017-0167534
Apr. 6, 2018 (KR) .......................... 10-2018-0040402

(51) Int. Cl.
*H01G 4/12* (2006.01)
*H01G 2/06* (2006.01)
(Continued)

(52) U.S. Cl.
CPC ........... *H01G 4/1218* (2013.01); *H01G 2/065* (2013.01); *H01G 4/005* (2013.01); *H01G 4/1272* (2013.01); *H01G 4/228* (2013.01)

(58) Field of Classification Search
CPC ........ H01G 4/012; H01G 4/1227; H01G 4/33; H01G 4/248; H01G 4/065; H01G 4/005;
(Continued)

(56) References Cited

U.S. PATENT DOCUMENTS 9,552,925 B2   1/2017   Masunari et al.
2004/0066603 A1   4/2004   Saito et al.
(Continued)

FOREIGN PATENT DOCUMENTS

CN   1471116 A   1/2004
CN   104103424 A   10/2014
(Continued)

OTHER PUBLICATIONS

Japanese Office Action dated Aug. 2, 2022, issued in corresponding Japanese Patent Application No. 2018-196300.
(Continued)

*Primary Examiner* — Michael P McFadden
(74) *Attorney, Agent, or Firm* — Morgan, Lewis & Bockius LLP

(57) ABSTRACT

A multilayer ceramic capacitor include: a ceramic body including first and second surfaces opposing each other and third and fourth surfaces connecting the first and second surfaces; a plurality of internal electrodes disposed inside the ceramic body and exposed to the first and second surfaces, the plurality internal electrodes each having one end exposed to the third or fourth surface; and first and second side margin portions disposed on sides of the internal electrodes exposed to the first and second surfaces. A dielectric composition of the first and second side margin portions is different from a dielectric composition of the ceramic body, and a dielectric constant of the first and second side margin portions is lower than a dielectric constant of the ceramic body.

17 Claims, 5 Drawing Sheets

Related U.S. Application Data continuation of application No. 16/163,965, filed on Oct. 18, 2018, now Pat. No. 10,903,006.

(51) Int. Cl.
*H01G 4/005* (2006.01)
*H01G 4/228* (2006.01)

(58) Field of Classification Search
CPC .... H01G 4/1272; H01G 4/228; H01G 4/1218; H01G 2/065; H01G 4/232; H01G 4/30; H01G 4/224; H01G 4/1209; C04B 35/4682; C04B 2235/3201; C04B 2235/3203; C04B 2235/3206; C04B 2235/3215; C04B 2235/3217; C04B 2235/3224; C04B 2235/3225; C04B 2235/3229; C04B 2235/3262; C04B 2235/3272; C04B 2235/3275; C04B 2235/3279; C04B 2235/3284; C04B 2235/3418; C04B 2235/36; C04B 2235/442; C04B 2235/75; C04B 35/47
See application file for complete search history.

(56) References Cited

U.S. PATENT DOCUMENTS

| | | | |
|---|---|---|---|
| 2008/0304204 | A1 | 12/2008 | Suzuki |
| 2012/0250221 | A1 | 10/2012 | Yamashita |
| 2014/0185185 | A1 | 7/2014 | Okajima et al. |
| 2014/0301013 | A1 | 10/2014 | Kim |
| 2014/0301015 | A1* | 10/2014 | Kim ................... H01G 4/12 29/25.03 |
| 2015/0340156 | A1* | 11/2015 | Masunari ............. H01G 4/1227 361/301.4 |
| 2015/0348712 | A1* | 12/2015 | Lee ........................ H01G 4/30 156/89.12 |
| 2016/0196918 | A1* | 7/2016 | Hong ..................... H01G 4/232 361/301.4 |
| 2017/0250027 | A1 | 8/2017 | Kowase |
| 2017/0301471 | A1* | 10/2017 | Ono ........................ H01G 4/224 |
| 2018/0061575 | A1* | 3/2018 | Mizuno .................. H01G 4/224 |
| 2018/0240598 | A1* | 8/2018 | Tanaka ..................... H01G 4/30 |
| 2018/0301282 | A1* | 10/2018 | Nishikawa ........ C04B 35/62272 |

FOREIGN PATENT DOCUMENTS

| | | |
|---|---|---|
| CN | 105097283 A | 11/2015 |
| CN | 107134365 A | 9/2017 |
| JP | H09-320887 A | 12/1997 |
| JP | 2010-208905 A | 9/2010 |
| JP | 2014-143392 A | 8/2014 |
| JP | 2015-029158 A | 2/2015 |
| JP | 2016-162868 A | 9/2016 |
| JP | 2017-011172 A | 1/2017 |
| KR | 10-2015-0135092 A | 12/2015 |
| KR | 10-2017-0081979 A | 7/2017 |

OTHER PUBLICATIONS

Office Action issued in corresponding Korean Application No. 10-2018-0040402, dated Apr. 17, 2019.
Chinese Office Action dated Aug. 20, 2021 issued in Chinese Patent Application No. 201811473767.0 {with English translation).
Japanese Office Action dated Jan. 24, 2023, issued in corresponding Japanese Patent Application No. 2018-196300 with English translation.

* cited by examiner

I-I'

MULTILAYER CERAMIC CAPACITOR

CROSS-REFERENCE TO RELATED APPLICATIONS

This application is the continuation application of U.S. patent application Ser. No. 17/093,968 filed on Nov. 10, 2020, now U.S. Pat. No. 11,367,570, which is a continuation of U.S. patent application Ser. No. 16/163,965 filed Oct. 18, 2018, now U.S. Pat. No. 10,903,006, which claims the benefit of priority to Korean Patent Application Nos. 10-2017-0167534, filed on Dec. 7, 2017 and 10-2018-0040402, filed on Apr. 6, 2018, in the Korean Intellectual Property Office, the disclosures of each are incorporated herein by reference in their entirety.

TECHNICAL FIELD

The present disclosure relates to a multilayer ceramic capacitor and a method of manufacturing the same, and more particularly, to a multilayer ceramic capacitor capable of relaxing an electric field concentrated at an end of an internal electrode to prevent insulation breakdown while having improved reliability and a method of manufacturing the same.

BACKGROUND

In general, an electronic component using a capacitor, an inductor, a piezoelectric element, a varistor or a thermistor includes a ceramic body formed of a ceramic material, an internal electrode formed inside the ceramic body, and an external electrode mounted on a surface of the ceramic body to be connected to the internal electrode.

As electronic products have become increasingly compact and multifunctional in recent years, chip components have trended toward miniaturization and high performance. Accordingly, there is an increasing demand for small-sized and high-capacitance multilayer ceramic capacitors.

Significant increase of an effective electrode area (i.e., an increase of an effective volume fraction needed for capacitance implementation) is required for miniaturization and high-capacitance of a multilayer ceramic capacitor.

To implement such a small-sized and high-capacitance multilayer ceramic capacitor, an internal electrode is exposed in a width direction of a ceramic body during manufacturing of a multilayer ceramic capacitor. Thus, a width-direction area of the internal electrode may be significantly increased through a design without a margin. Before chip sintering following fabrication of such a chip, a margin portion is separately attached to an exposed surface of the electrode in a width direction of the chip to complement the multilayer ceramic capacitor. Such a manufacturing method has been employed to implement a small-sized and high-capacitance multilayer ceramic capacitor.

However, when a multilayer ceramic capacitor is manufactured using the method as described above, a dielectric composite of a ceramic body has been conventionally used as is, without a dielectric composition for formation of a side margin portion being differentiated from a dielectric composition of the ceramic body.

One of the main defects of a multilayer ceramic capacitor is insulation breakdown, caused by an electric field concentrated at an end of an internal electrode.

The electric field concentrated at the end of the internal electrode should be reduced to prevent the insulation breakdown, a main defect of multilayer ceramic capacitors.

Accordingly, there is a need for research into a technology capable of relaxing an electric field concentrated at an end of an internal electrode.

SUMMARY

An aspect of the present disclosure is to provide a multilayer ceramic capacitor capable of relaxing an electric field concentrated at an end of an internal electrode to prevent insulation breakdown while having improved reliability and a method of manufacturing the same.

According to an aspect of the present disclosure, a multilayer ceramic capacitor includes: a ceramic body including first and second surfaces opposing each other and third and fourth surfaces connecting the first and second surfaces; a plurality of internal electrodes disposed inside the ceramic body and exposed to the first and second surfaces, the plurality internal electrodes each having one end exposed to the third or fourth surface; and first and second side margin portions disposed on sides of the internal electrodes exposed to the first and second surfaces. A dielectric composition of the first and second side margin portions is different from a dielectric composition of the ceramic body, and a dielectric constant of the first and second side margin portions is lower than a dielectric constant of the ceramic body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
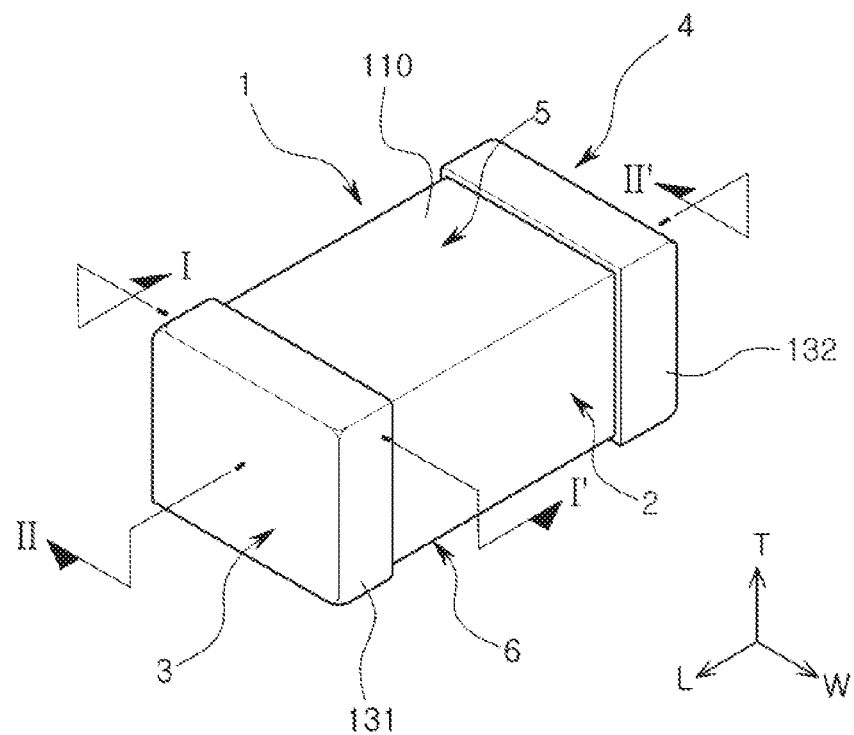
FIG. 1 is a perspective view of a multilayer ceramic capacitor according to an exemplary embodiment in the present disclosure.

Hereinafter, exemplary embodiments in the present disclosure will be described below in detail with reference to the accompanying drawings, where those components rendered using the same reference number are the same or are in correspondence, regardless of the figure number, and redundant explanations are omitted. In the accompanying drawings, shapes, sizes, and the like, of components may be exaggerated or stylized for clarity.

The present disclosure may, however, be exemplified in many different forms and should not be construed as being limited to the specific embodiments set forth herein. Rather these embodiments are provided so that this disclosure will be thorough and complete, and will fully convey the scope of the disclosure to those skilled in the art.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

The meaning of a "connection" of a component to another component in the description includes an indirect connection through a third component as well as a direct connection between two components. In addition, "electrically connected" means the concept including a physical connection and a physical disconnection. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

Herein, an upper portion, a lower portion, an upper side, a lower side, an upper surface, a lower surface, and the like, are decided in the accompanying drawings. In addition, a vertical direction refers to the abovementioned upward and downward directions, and a horizontal direction refers to a direction perpendicular to the abovementioned upward and downward directions. In this case, a vertical cross section refers to a case taken along a plane in the vertical direction, and an example thereof may be a cross-sectional view illustrated in the drawings. In addition, a horizontal cross section refers to a case taken along a plane in the horizontal direction, and an example thereof may be a plan view illustrated in the drawings.

Terms used herein are used only in order to describe an exemplary embodiment rather than limiting the present disclosure. In this case, singular forms include plural forms unless interpreted otherwise in context.

Figure 2:
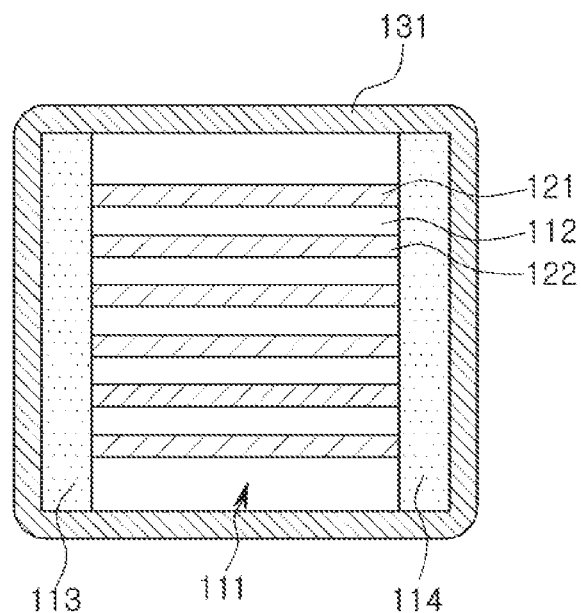
FIG. 2 is a cross-sectional view taken along line I-I' in FIG. 1.
Figure 3:
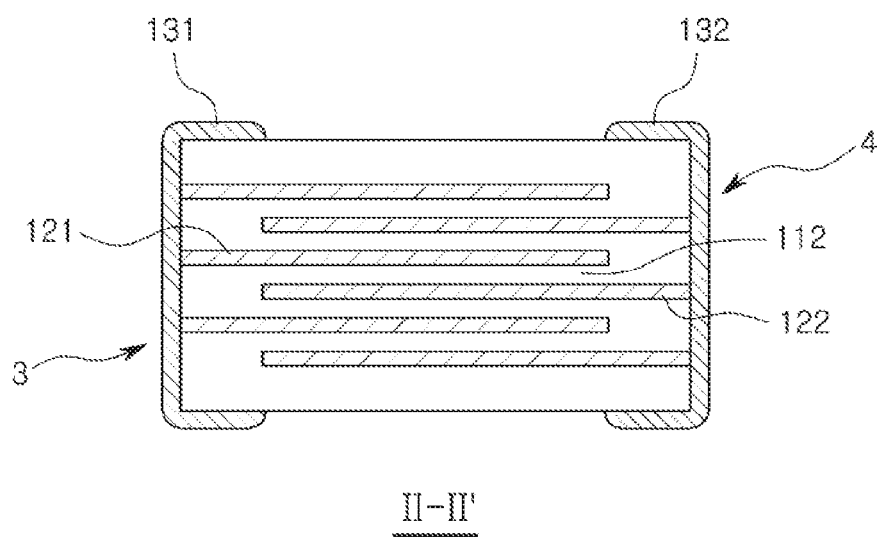
FIG. 3 is a cross-sectional view taken along line II-II' in FIG. 1.
Figure 4:
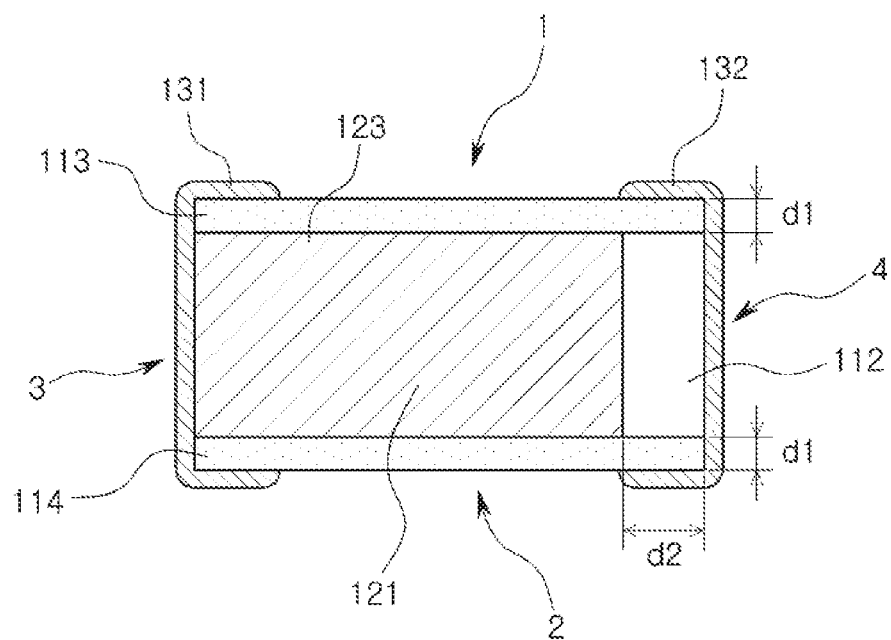
FIG. 4 is a plan view of a single dielectric layer constituting the multilayer ceramic capacitor shown in FIG. 1.

FIG. 1 is a perspective view of a multilayer ceramic capacitor according to an exemplary embodiment. FIG. 2 is a cross-sectional view taken along line I-I' in FIG. 1, and FIG. 3 is a cross-sectional view taken along line II-II' in FIG. 1. FIG. 4 is a plan view of a single dielectric layer constituting the multilayer ceramic capacitor shown in FIG. 1.

Referring to FIGS. 1 to 4, a multilayer ceramic capacitor according to an exemplary embodiment in the present disclosure includes a ceramic body 110, a plurality of internal electrodes 121 and 122 disposed inside the ceramic body 110, and external electrodes 131 and 132 disposed on an external surface of the ceramic body 110.

The ceramic body 110 may have a first surface 1 and a second surface 2 opposing each other, a third surface 3 and a fourth surface 4 connecting the first and second surfaces 1 and 2 to each other, and a fifth surface 5 and a sixth surface 6 which are a top surface and a bottom surface, respectively.

The first and second surfaces 1 and 2 may be defined as surfaces opposing each other in a width direction of the ceramic body 110, and the third and fourth surfaces 3 and 4 may be defined as surfaces opposing each other in a length direction of the ceramic body 110. The fifth and sixth surfaces 5 and 6 may be defined as surfaces opposing each other in a thickness direction of the ceramic body 110.

The shape of the ceramic body 110 is not particularly limited, but, in some embodiments, may be a rectangular parallelepiped shape, as shown in the figures.

Each of the plurality of internal electrodes 121 and 122 disposed inside the ceramic body 110 has one end exposed to the third surface 3 or the fourth surface 4. The internal electrodes 121 and 122 may include a pair of first and second electrodes 121 and 122 having different polarities.

One end of the first internal electrode 121 may be exposed to the third surface 3, and one end of the second internal electrode 122 may be exposed to the fourth surface 4.

The ends of the first and second internal electrodes 121 and 122 may be spaced apart from the third surface 3 or the fourth surface at regular intervals, which will be described in detail later.

The first and second external electrodes 131 and 132 may be disposed on the third and fourth surfaces 3 and 4 of the ceramic body 110 to be electrically connected to the internal electrodes 121 and 122, respectively.

A multilayer ceramic capacitor according to an exemplary embodiment may include a plurality of internal electrodes 121 and 122 disposed inside the ceramic body 110 and exposed to the first and second surfaces 1 and 2, each of the internal electrodes 121 and 122 having one end exposed to the third surface 3 or the fourth surface 4, and a first side margin portion 113 and a second side margin portion 114 disposed on the sides of the internal electrodes 121 and 122 exposed to the first and second surfaces 1 and 2.

A plurality of internal electrodes 121 and 122 are disposed inside the ceramic body 110. Sides of the internal electrodes 121 and 122 are exposed to the first and second surfaces 1 and 2 which are width-direction surfaces of the ceramic body 110, respectively. The first side margin portion 113 and the second side margin portion 114 are disposed on the exposed ends, respectively.

Each of the first and second side margin portions 113 and 114 may have a width d1 less than or equal to 18 micrometers (pm).

According to an exemplary embodiment, the ceramic body 110 may include a multilayer body 111 in which a plurality of dielectric layers 112 are laminated and a first margin portion 113 and a second margin portion 114 which are disposed at opposite sides of the multilayer body 111, respectively.

The plurality of dielectric layers 112 constituting the multilayer body 111 are in a sintered state, and a boundary between adjacent dielectric layers 112 may be integrated to such an extent that it cannot be recognized.

A length of the multilayer body 111 is equivalent to a length of the ceramic body 110, and the length of the ceramic body 110 is equivalent to a distance between the third and fourth surfaces 3 and 4 of the ceramic body 110. That is, it would be appreciated that the third and fourth surfaces 3 and 4 of the ceramic body 110 are third and fourth surfaces of the multilayer body 111, respectively.

The multilayer body 111 is formed by laminating the plurality of dielectric layers 112, and a length of the multilayer body 111 forms a distance between the third and fourth surfaces 3 and 4 of the ceramic body 110.

The length of the ceramic body 110 is not limited to the above. According to an exemplary embodiment, the length of the ceramic body 110 may be between 400 and 1400 µm. More specifically, the length of the ceramic body 110 may be between 400 and 800 µm or between 600 and 1400 µm.

The internal electrodes 121 and 122 may be disposed on the dielectric layer 112. By sintering, the internal electrodes 122 and 122 may be disposed inside the ceramic body 110 with a single dielectric layer interposed therebetween.

Referring to FIG. 4, the first internal electrode 1221 is disposed at the dielectric layer 112. The first internal electrode 121 is not entirely disposed with respect to a length direction of the dielectric layer 112. That is, one end of the first internal electrode 121 may be disposed at a predetermined distance from the fourth surface 4 of the ceramic body 110 and the other end thereof may be disposed up to the third surface 3 to be exposed to the third surface 3, being connected to the first external electrode 131.

In contrast to the first internal electrode 121, one end of the second internal electrode 122 is disposed at a predetermined distance from the third surface 3 and the other end thereof is exposed to the fourth surface 4 to be connected to the second external electrode 132.

The dielectric layer 112 may have the same width as the first internal electrode 121. That is, the first internal electrode 121 may be entirely disposed with respect to a width direction of the dielectric layer 112.

Width of the dielectric layer 112 and the first internal electrode 121 are not limited to the above. According to an exemplary embodiment in the present disclosure, width of the dielectric layer 112 and width of the first internal electrode 121 may be between 100 and 900 μm. More specifically, the width of the dielectric layer 112 and the width of the first internal electrode 121 may be between 100 and 500 μm or between 100 and 900 μm.

As a ceramic body becomes smaller, a width of a margin portion may affect electrical characteristics of a multilayer ceramic capacitor. According to an exemplary embodiment in the present disclosure, a side margin portion may be formed to a width of 18 μm or less to enhance characteristics of a miniaturized multilayer ceramic capacitor.

In an exemplary embodiment in the present disclosure, an internal electrode and a dielectric layer are simultaneously cut to be formed. The internal electrode may have the same width as the dielectric layer, which will be described later in detail.

In an exemplary embodiment in the present disclosure, the dielectric layer is formed to have the same width as the internal electrode. Thus, sides of the internal electrodes 121 and 122 may be exposed to widthwise first and second surfaces of the ceramic body 110.

A first side margin portion 113 and a second side margin portion 114 may be formed on opposite widthwise surfaces of the ceramic body 110 to which ends of the internal electrodes 121 and 122 are exposed.

A width of each of the first and second side margin portions 113 and 114 may be less than or equal to 18 μm. The greater the widths of the first and second side margin portions, the larger an area of overlap of the internal electrode disposed inside the ceramic body 110.

The widths of the first and second side margin portions 113 and 114 are not particularly limited as long as they are enough to prevent a short-circuit between internal electrodes exposed to a side surface of the multilayer body 111. For example, the width of each of the first and second side margin portions 113 and 114 may be greater than or equal to 2 μm.

When the width of each of the first and second side margin portions 113 and 114 is less than 2 μm, there is a concern that mechanical strength against an external impact may be reduced. When the width of each of the first and second side margin portions 113 and 114 is greater than 18 μm, the area of overlap of the internal electrode may be reduced to make it difficult to secure high-capacitance in the multilayer ceramic capacitor.

Several methods to significantly increase capacitance of the multilayer ceramic capacitor are under consideration. The various methods include a method to make a dielectric layer thinner, a method to form a higher multilayer structure by laminating thinned dielectric layers, a method to improve the coverage of an internal electrode, and the like.

In addition, a method to increase an area of overlap of an internal electrode which establishes capacitance is under consideration.

A margin area, in which an internal electrode is not formed, may be significantly reduced to increase an area of overlap of the internal electrode.

In particular, as a multilayer ceramic capacitor is miniaturized, a margin portion area should be significantly reduced to increase the area of overlap of the internal electrode.

According to an exemplary embodiment in the present disclosure, there is the feature that an internal electrode is formed in the entire width direction of a dielectric layer and a width of a side margin portion is set to 18 μm or less, so an area of overlap of the internal electrode has a large area.

In general, as dielectric layers are laminated to form a higher multilayer structure, the dielectric layer and an internal electrode are thinned. Thus, the internal electrode may be frequently short-circuited. Moreover, when the internal electrode is only formed in a portion of the dielectric layer, a step may be formed to reduce accelerated lifespan or reliability of an insulating resistor.

However, according to an exemplary embodiment in the present disclosure, capacitance of a multilayer ceramic capacitor may increase even when a thin-film internal electrode and a dielectric layer are formed. This is because the internal electrode is formed in the entire width direction of the dielectric layer.

In addition, a step formed by an internal electrode is reduced to improve accelerated life of an insulating resistor. Thus, a multilayer ceramic capacitor with improved capacitance characteristics and improved reliability may be provided.

Insulation breakdown, one of the main defects of a multilayer ceramic capacitor, occurs due to an electric field concentrated at an end of an internal electrode.

The electric field concentrated at the end of the internal electrode should be reduced to prevent the insulation breakdown which is one of the main defects of the multilayer ceramic capacitor.

According to an exemplary embodiment in the present disclosure, a dielectric composition of the first and second side margin portions 113 and 114 is different from a dielectric composition of the ceramic body 110.

In addition, a dielectric constant of the first and second side margin portions 113 and 114 is lower than that of the ceramic body 110.

The dielectric constant of the first and second side margin portions 113 and 114 are adjusted to be lower than that of the ceramic body. Thus, an electric field concentrated at an end of an internal electrode may be reduced and insulation breakdown, a main defect of the multilayer ceramic capacitor, may be prevented. As a result, reliability of the multilayer ceramic capacitor may be improved.

As mentioned above, insulation breakdown, a main defect of a typical multilayer ceramic capacitor, occurs due to an electric field concentrated at an end of an internal electrode. According to an exemplary embodiment in the present disclosure, as a way to relax the electric field concentrated at the end of the internal electrode, the dielectric constant of the first and second side margin portions 113 and 114 may be controlled to be lower than that of the ceramic body 110.

That is, when the dielectric constant of the first and second side margin portions 113 and 114 is lower than that of the ceramic body 110, the electric field concentrated at the end of the internal electrode is dispersed and reduced.

In an exemplary embodiment in the present disclosure, the ceramic body 110 refers to a portion including an active region in which a first internal electrode 121 and a second internal electrode 122 overlap each other and a top and bottom cover portion regions, corresponding to the active region.

In a typical multilayer ceramic capacitor, ceramic green sheets having the same dielectric composition are laminated when fabricating a ceramic body, including an active region in which internal electrodes overlap each other to establish capacitance, and a margin portion, in which internal electrodes do not overlap each other or no internal electrode is formed. Therefore, a dielectric composition of the active region is generally identical to that of the margin portion.

In the case of such a conventional multilayer ceramic capacitor, a ceramic body including an active region and a margin portion is fabricated by laminating ceramic green sheets having the same dielectric composition. Therefore, the conventional multilayer ceramic capacitor has a structure in which the dielectric compositions of both the regions cannot be different.

To implement a small-sized and high-capacitance multilayer ceramic capacitor according to an exemplary embodiment in the present disclosure, an internal electrode is exposed in a width direction of a ceramic body during manufacturing of a multilayer ceramic capacitor. Thus, a width-direction area of the internal electrode is significantly increased through a design without margin. Before chip sintering following fabrication of such a chip, a margin portion is separately attached to an exposed surface of the electrode in a width direction of the chip to complement the multilayer ceramic capacitor. Such a manufacturing method has been employed.

However, when a multilayer ceramic capacitor is manufactured in the same method as described above, a dielectric composite of a ceramic body has been conventionally used as is, without differentiating a dielectric composition for formation of a side margin portion from a dielectric composition of the ceramic body.

As described above, conventionally, a dielectric composition for formation of a side margin portion is used as a dielectric composition of a ceramic body without differentiating the dielectric composition of the ceramic body. Therefore, the dielectric compositions of both the regions are identical to each other and are not applied differently.

However, according to an exemplary embodiment in the present disclosure, a dielectric composition of the first and second side margin portions 113 and 114 and a dielectric composition of the ceramic body 110 are different from each other and a dielectric constant of the first and second side margin portion 113 and 114 is lower than that of the ceramic body 110.

The dielectric constant of the first and second side margin portions 113 and 114 is controlled to be lower than that of the ceramic body 110, which may be achieved by adjusting the content of a subcomponent included in a dielectric material, according to an exemplary embodiment in the present disclosure.

In particular, according to an exemplary embodiment in the present disclosure, contents of subcomponents are adjusted to be different in terms of the dielectric composition of the first and second side margin portions 113 and 114 and the dielectric composition of the ceramic body 110. Therefore, the content of a subcomponent included in the whole of the side margin portion and the content of the same subcomponent included in the ceramic body 110 are different from each other.

In general, as a subcomponent included in a ceramic body is allowed to move into a side margin portion by diffusion, the content of the subcomponent may be higher in some regions of the side margin portion.

However, according to an exemplary embodiment in the present disclosure, an internal electrode is exposed in a width direction of a ceramic body to separately attach a margin portion to an exposed surface of a widthwise electrode of a chip in a step prior to firing after the chip is manufactured through a marginless design. As a result, the multilayer ceramic capacitor is completed. Since a dielectric composition for formation of a side margin portion is made different from that of the ceramic body, the content of a subcomponent in the whole of the side margin portion is different from that of the content of the same component included in the ceramic body.

A dielectric-magnetic composite included in the first and second side margin portions 113 and 114 and the ceramic body 110 includes a base material main component containing barium (Ba) and titanium (Ti).

The base material main component includes a main component expressed as (Ba,Ca)(Ti,Ca)O3, (Ba,Ca)(Ti,Zr)O3, Ba(Ti,Zr)O3, and (Ba,Ca)(Ti,Sn)O3 in which some of BaTiO3 or Ca, Zr, Sn, and the like are employed. The base material main component may be included in the form of a powder.

The dielectric-magnetic composite included in the first and second side margin portions 113 and 114 and the ceramic body 110 may include a first subcomponent containing at least one of Mn, V, Cr, Fe, Ni, Co, Cu, and Zn, as a subcomponent.

The dielectric-magnetic composite included in the first and second side margin portions 113 and 114 and the ceramic body 110 may further include a second subcomponent, a third subcomponent, a fourth subcomponent, and a fifth subcomponent. The second subcomponent contains at least one of Ba and Ca. The third subcomponent contains a Si-containing oxide or carbonate or a Si-containing glass compound. The fourth subcomponent includes at least one of Y, Dy, Ho, Er, Gd, Ce, Nd, Sm, La, Tb, Yb, and Pr. The fifth subcomponent contains Mg or Al.

According to an exemplary embodiment in the present disclosure, a dielectric constant may be made different by controlling the contents of manganese (Mn) and silicon (Si) as subcomponents included in the first and second side margin portions 113 and 114 and the ceramic body 110.

More specifically, the contents of Mn and Si included in the first and second side margin portions 113 and 114 are higher than those of Mn and Si included in the ceramic body 110.

By adjusting the contents of Mn and Si included in the first and second side margin portions 113 and 114 to be higher than those in Mn and Si included in the ceramic body 110, the dielectric constant of the first and second side margin portions 113 and 114 may be controlled to be lower than that of the ceramic body 110.

The contents of Mn and Si included in the whole of the first and second margin portions 113 and 114 are higher than those of Mn and Si included in the ceramic body 110.

That is, a difference in the contents of Mn and Si occurs in the whole of the first and second side margin portions 113 and 114, not in only some regions of the first and second side margin portions, for example, in an adjacent region in contact with the ceramic body 110.

Unlike the related art, the above features are possible because a dielectric composition for formation of a ceramic body is made different from a dielectric composition for formation of first and second side margin portions during manufacturing of a multilayer ceramic capacitor.

Thus, an electric field concentrated at an end of an internal electrode may be reduced and insulation breakdown, which is one of the main defects of a multilayer ceramic capacitor, may be prevented to improve reliability of the multilayer ceramic capacitor.

The dielectric constant of the first and second side margin portions 113 and 114 is controlled to be lower than that of the ceramic body 110, which may be achieved by adjusting the content of rare-earth oxide among subcomponents included in a dielectric material, according to an exemplary embodiment in the present disclosure.

More specifically, the content of rare earth oxide included in the first and second side margin portions 113 and 114 may be less than that of rare earth oxide included in the ceramic body 110. However, the present disclosure is not limited thereto. The content of rare earth oxide included in the first and second side margin portions 113 and 114 may be equal to than that of rare earth oxide included in the ceramic body 110.

The rare earth elements are not particularly limited but may be at least one of, for example, Y, Dy, Ho, Er, and Yb.

As a manner of controlling the dielectric constant of the first and second side margin portions 113 and 114 to be lower than that of the ceramic body 110, the first and second side margin portions 113 and 114 may include sodium (Na) and lithium (Li), according to an exemplary embodiment in the present disclosure.

The first and second side margin portions 113 and 114 further include sodium (Na) and lithium (Li), which makes the dielectric constant of the first and second side margins 113 and 114 lower than that of the ceramic body 110. Thus, an electric field concentrated at an end of an internal electrode may be reduced and insulation breakdown may be prevented to improve reliability of a multilayer ceramic capacitor.

Although sodium (Na) and lithium (Li) may be selectively included in the ceramic body 110, they are essentially included in the first and second side margin portions 113 and 114 such that the dielectric constant of the first and second side margin portions 113 and 114 is controlled to be lower than that of the ceramic body 110, according to an exemplary embodiment in the present disclosure. In addition, the content of sodium (Na) and lithium (Li) included in the first and second side margin portions 113 and 114 may be higher than that of sodium (Na) and lithium (Li) included in the ceramic body 110.

The content of sodium (Na) and lithium (Li) included in the whole of the first and second side margin portions 113 and 114 is higher than that of sodium (Na) and lithium (Li) included in the ceramic body 110.

Hereafter, a method of manufacturing a multilayer ceramic capacitor according to another exemplary embodiment in the present disclosure will now be described.

FIGS. 5A to 5F are cross-sectional vies and perspective views of a multilayer ceramic capacitor according to another exemplary embodiment in the present disclosure.

Figure 5A:
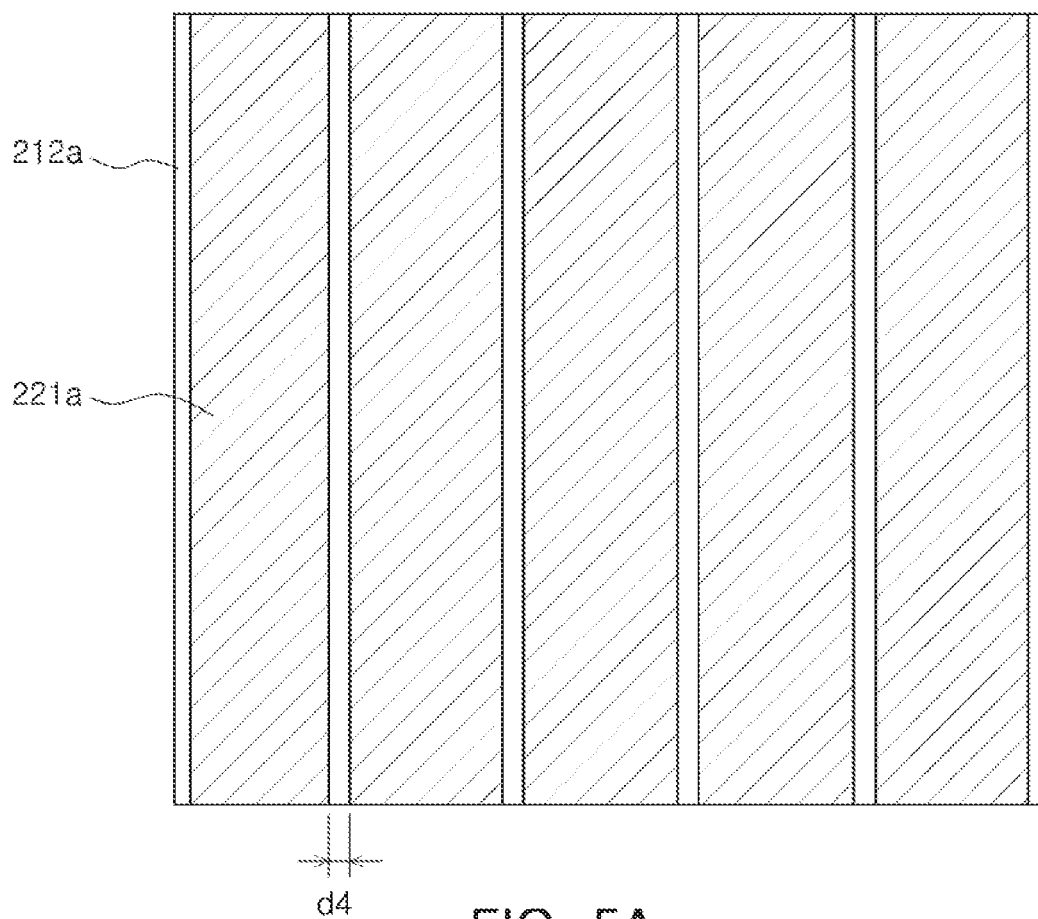
FIGS. 5A to 5F are cross-sectional vies and perspective views of a multilayer ceramic capacitor according to another exemplary embodiment in the present disclosure.

As shown in FIG. 5A, a plurality of stripe-type first internal electrode patterns 221a are formed over a ceramic green sheet 212a at a predetermined distance d4. The plurality of stripe-type first internal electrode patterns 221a may be formed parallel to each other.

The predetermined distance d4 is a distance to insulate an internal electrode from an external electrode having a different polarity than the internal electrode and would be understood as a distance of d2×2 shown in FIG. 4.

The ceramic green sheet 212a may be formed of a ceramic paste including a ceramic powder, an organic solvent, and an organic binder.

The ceramic powder is a material with a high dielectric constant but is not limited thereto. The ceramic powder may include a barium titanate (BaTiO3)-based material, a lead composite perovskite-based material or a strontium titanate (SrTiO3)-based material. Preferably, the ceramic powder may be a barium titanate (BaTiO3) powder. When being fired, the ceramic green sheet 212a becomes a dielectric layer 112 constituting a ceramic body.

The stripe-type first internal electrode pattern 221a may be formed by an internal electrode paste including a conductive metal. The conductive metal may be nickel (Ni), copper (Cu), palladium (Pd) or an alloy thereof, but is not limited thereto.

The stripe-type first internal electrode pattern 221a may be formed on the ceramic green sheet 221a by a printing technique such as screen printing or gravure printing, but the present disclosure is not limited thereto.

Although not shown in the drawings, a plurality of stripe-type second internal electrode patterns 222a maybe formed over another ceramic green sheet 212a at a predetermined distance.

Hereafter, a ceramic green sheet where the first internal electrode pattern 221a is formed will be referred to as a first ceramic green sheet and a ceramic green sheet where the second internal electrode pattern 222a is formed will be referred to as a second ceramic green sheet.

Figure 5B:
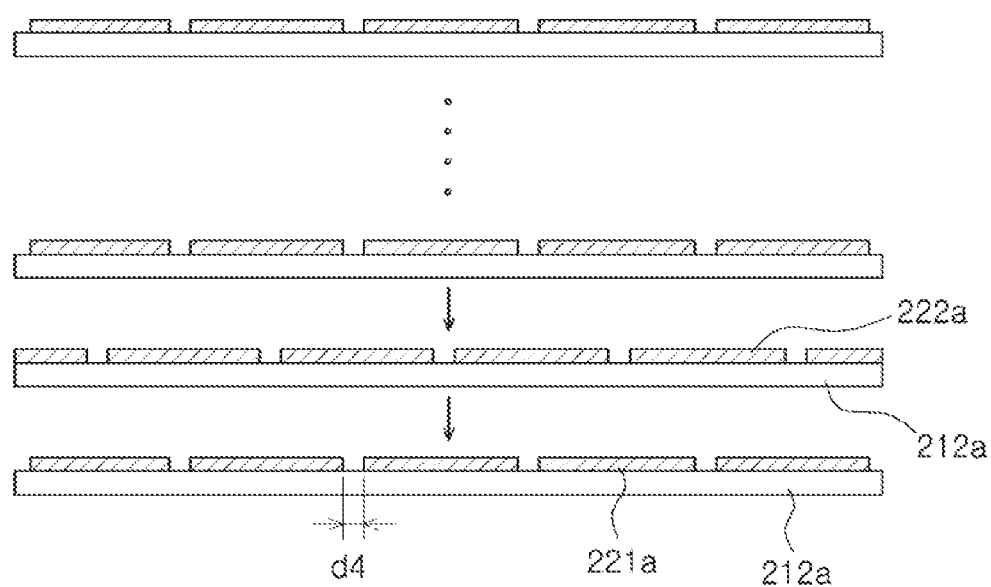

As shown in FIG. 5B, the first and second ceramic green sheets may be alternately laminated in such a manner that the stripe-type first internal electrode pattern 221a and the stripe-type second internal electrode pattern 222a are cross-stacked.

The stripe-type first internal electrode pattern 221a may form a first internal electrode 121, and the stripe-type second internal electrode pattern 222a may form a second internal electrode 122.

Figure 5C:
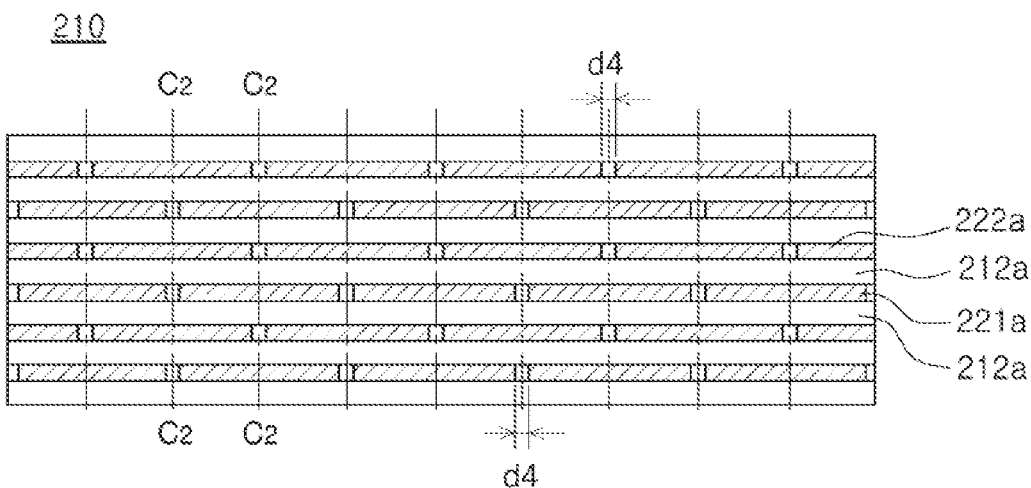
Figure 5D:
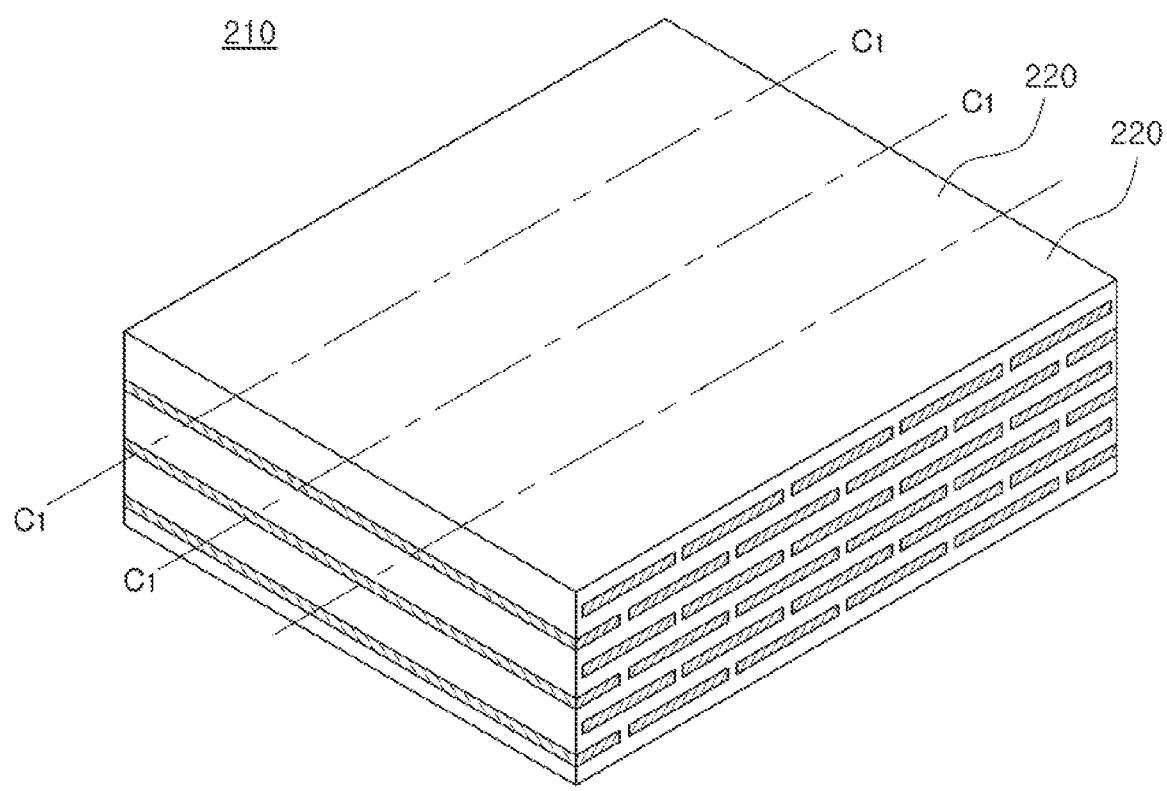

FIG. 5C is a cross-sectional view of a green sheet multilayer structure 210 in which first and second ceramic green sheets are stacked, and FIG. 5D is a perspective view of the green sheet multilayer structure 210 in which first and second ceramic green sheets are stacked.

Referring to FIGS. 5C and 5D, a first ceramic green sheet and a second ceramic green sheet are alternately stacked. A plurality of parallel stripe-type first internal electrode patterns 221a are printed on a first ceramic green sheet, and a plurality of parallel stripe-type second internal electrode patterns 222a are printed on a second ceramic green sheet.

More specifically, the first and second ceramic green sheets may be stacked to overlap a distance d4 between the center of the stripe-type first internal electrode pattern 221a printed on the first ceramic green sheet and the stripe-type second internal electrode pattern 222a printed on the second ceramic green sheet.

As shown in FIG. 5D, the ceramic green sheet multilayer structure 210 may be cut across the plurality of stripe-type first internal electrode pattern 221a and the plurality of stripe-type second internal electrode pattern 222a. That is, the ceramic green sheet multilayer structure 210 may be a rod-shaped multilayer structure cut along line C1-C1.

More specifically, the stripe-type first internal electrode pattern 221a and the stripe-type second internal electrode pattern 222a may be cut lengthwise to be divided into a plurality of internal electrodes each having a constant width. At this point, the stacked ceramic green sheet is also cut. Thus, the dielectric layer may be formed to have the same width as the internal electrode.

Sides of the first and second internal electrodes may be exposed to cut surfaces of the rod-shaped multilayer structure 220. The cut surfaces of the rod-shaped multilayer structure 220 may be referred to as a first side surface and a second side surface, respectively.

The ceramic green sheet multilayer structure 220 may be cut as a rod-shaped multilayer structure after being fired. In addition, the ceramic green sheet multilayer structure may be fired after being cut as a rod-shaped multilayer structure. The present disclosure is not limited thereto, and the firing may be performed in an N2-H2 ambient atmosphere at a temperature between 1100 and 1300 degrees Celsius.

Figure 5E:
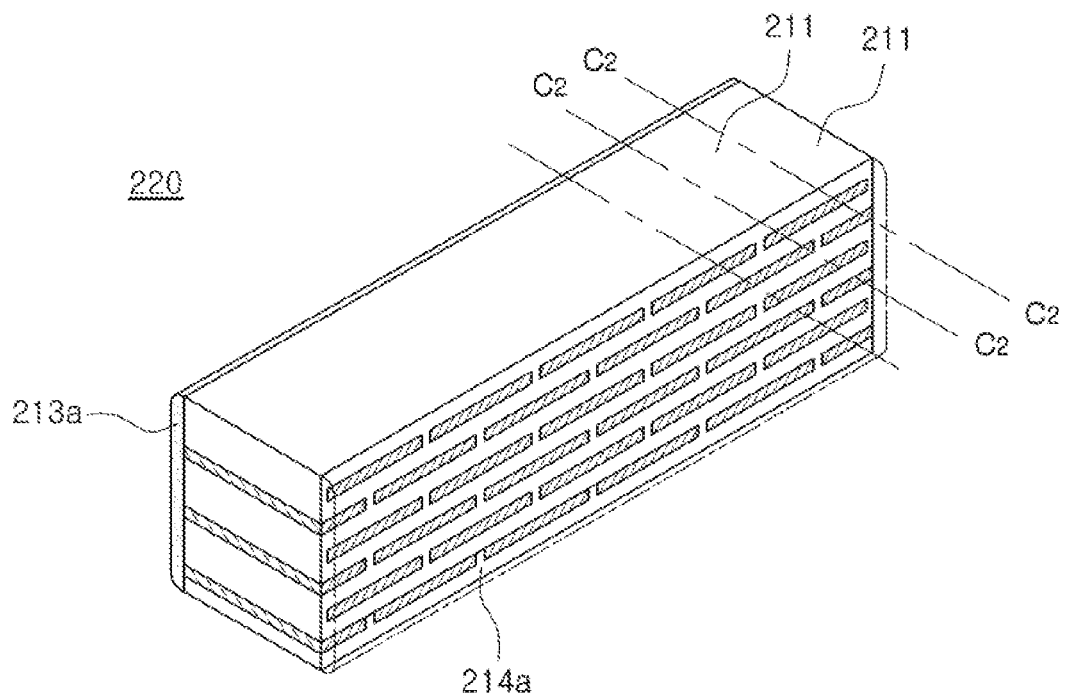

As shown in FIG. 5E, a first side margin portion 213a and a second side margin portion 214a may be formed on a first side surface and a second side surface of the rod-shaped multilayer structure 220, respectively. It will be appreciated that in FIG. 5E an outline of the second side margin portion 214a is depicted using dotted lines.

The first and second side margin portions 213a and 214a may be formed of ceramic slurry including a ceramic powder.

The ceramic slurry includes a ceramic powder, an organic binder, and an organic solvent. The amount of the ceramic slurry may be adjusted such that each of the side and second side margin portions 213a and 214a has a required width (i.e., thickness of the coating of the ceramic slurry).

According to an exemplary embodiment in the present disclosure, a composition in the ceramic slurry for formation of the first and second side margin portions 213a and 214a is different from a composition in the ceramic paste for formation of the rod-shaped multilayer structure 220.

That is, the composition in the ceramic slurry for formation of the first and second side margin portions 213a and 214a is different from the composition in the ceramic paste for formation of the rod-shaped multilayer structure 220 such that a dielectric constant of the first and second side margin portions 213a and 214a is lower than a dielectric constant of the rod-shaped multilayer structure 220.

The detailed compositions are the same as those of the first and second side margin portions and the ceramic body according to the above-described exemplary embodiment in the present disclosure.

Ceramic slurry may be coated on the first and second side surfaces 213a and 214a of the rod-shaped multilayer 220 to form the first and second side margin portions 113 and 114. A coating method of the ceramic slurry is not particularly limited, and the ceramic slurry may be dispensed by spraying or coated using a roller.

In some embodiments, the rod-shaped multilayer structure 220 may be dipped in the ceramic slurry to form first and second side margin portions 213a and 214a on first and second side surfaces of the rod-shaped multilayer structure.

As mentioned above, each of the first and second side margin portions 213a and 214a may be formed to have a width (i.e., thickness of the ceramic slurry coating) less than or equal to 18 μm.

Figure 5F:
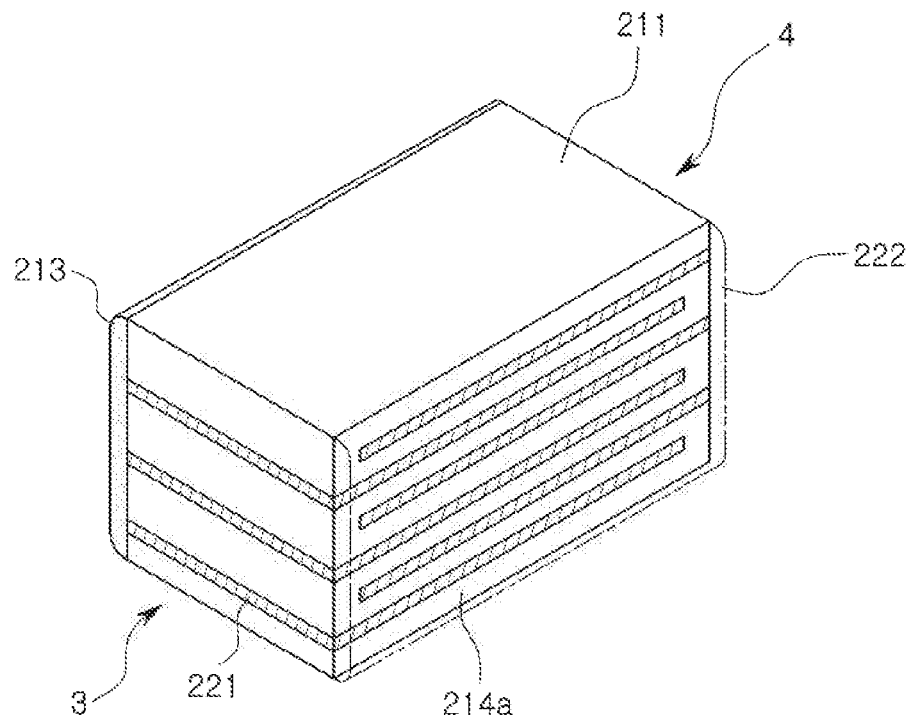

As shown in FIGS. 5E to 5F, the rod-shaped multilayer structure 220 where the first and second side 10 margin portions 213a and 214a are formed may be cut along a cutting line C2-C2 according to individual chip size.

As the rod-shaped multilayer structure 220 is cut according to individual chip size, a ceramic body including a multilayer body 211 and first and second side margin portions 213 and 214 disposed at opposite sides of the multilayer body 220 may be formed.

As the rod-shaped multilayer structure 220 is cut along the cutting line C2-C2, a predetermined distance d4 formed between the center of the first internal electrode and the second electrode which overlap each other may be cut along the same cutting line C2-C2. When viewed from another viewpoint, the predetermined distance d4 formed between the center of the second internal electrode and the first electrode may be cut along the same cutting line C2-C2.

Accordingly, one end of the first internal electrode and one end of the second internal electrode may be alternately exposed to the cut surface formed along the cutting line C2-C2. It would be appreciated that a surface to which the first internal electrode is exposed is a third surface 3 of the multilayer structure shown in FIG. 4 and a surface to which the second internal electrode is exposed is a fourth surface 4 of the multilayer structure shown in FIG. 4.

As the rod-shaped multilayer structure 220 is cut along the cutting line C2-C2, a predetermined distance d4 between the stripe-type first internal patterns 221a is cut in half, allowing one end of the first internal electrode 121 to form a predetermined distance d2 from the fourth surface and allowing the second internal electrode 122 to form a predetermined distance from the third surface.

External electrodes may be formed on the third and fourth surfaces to be connected to one end of the first internal electrode and one end of the second internal electrode.

Similar to the exemplary embodiment in the present disclosure, when first and second side margin portions are formed at the rod-shaped multilayer structure 220 and is cut according to chip size, a side margin portion may be formed at the plurality of multilayer bodies 211 through a single process.

In addition, although not shown in the drawings, a rod-shaped multilayer structure may be cut according to chip size to form a plurality of multilayer structures prior to formation of first and second side margin portions.

That is, the rod-shaped multilayer structure may be cut such that a predetermined distance formed between the center of the first internal electrode and the second internal electrode which overlap each other is cut along the same cutting line. Thus, one end of the first internal electrode and one end of the second internal electrode may be alternately exposed to a cut surface.

Then, a first side margin portion and a second side margin portion may be formed on the first and second surfaces of the multilayer body. The first and second side margin portions are formed in the same manner as described above.

External electrodes may be formed on a third surface of the multilayer body to which the first internal electrode is exposed and a fourth surface of the multilayer body to which the second internal electrode is exposed, respectively.

In another exemplary embodiment in the present disclosure, ends of first and second internal electrodes are exposed through first and second surfaces of a multilayer structure. A plurality of first and second internal electrodes stacked may be simultaneously cut to be placed in a straight line. Then, first and second side margin portions are collectively formed on the first and second surfaces of the multilayer structure. A ceramic body is formed by the multilayer structure and the first and second side margin portions. That is, the first and second side margin portions form first and second side surfaces of the ceramic body, respectively.

Thus, according to an exemplary embodiment in the present disclosure, a distance from one end of each of the plurality of internal electrodes to the first and second surfaces of the ceramic body may be constant. Additionally, the first and second side margin portions are formed by a ceramic paste and may each be formed to have a small thickness.

Hereinafter, the present disclosure will be described more fully with reference to an experimental example. However, the experimental example is provided to facilitate detailed understanding of the present disclosure and the scope of the present disclosure is not limited by the experimental example.

EXPERIMENTAL EXAMPLE

According to an exemplary embodiment of the present disclosure, a dielectric composition for formation of a ceramic body and a dielectric composition for formation of first and second side margin portions are prepared to be different from each other.

Subcomponents according to an exemplary embodiment in the present disclosure, which are not different in content from a base material main component, are equivalently applied in both a dielectric composite for formation of the ceramic body and a dielectric composite for formation of the first and second side margin portions.

Specifically, in the dielectric composite for formation of the ceramic body and the dielectric composite for formation of the first and second side margin portions, BaTiO3 powder of 50 nm or less was used as a base material main component.

According to an exemplary embodiment in the present disclosure, the content of a dielectric composite for formation of each region was adjusted such that the contents of manganese (Mn) and silicon (Si), as subcomponent, are higher in the first and second side margin portions, as compared to the ceramic body.

Meanwhile, in a comparative example, the contents of manganese (mg) and silicon (Si) were the same in a ceramic body and first and second side margin portions.

When slurry was prepared, base material main component and subcomponent powder as used mixing/dispersing media of zirconia balls. After ethanol/toluene and a dispersant were mixed, mechanical milling was performed. Then, a binder mixing process was added to implement dielectric sheet strength.

A molded sheet having a thickness of 10 to 20 μm was fabricated such that prepared slurry could form a side margin portion using an on-roll molding coater of a head discharge type.

The internal electrode was exposed widthwise and thus was cut into a size of 5×5 cm such that a side margin portion might be formed by attaching a molding sheet to an electrode exposed portion of a marginless green chip.

By applying constant temperature and pressure under a condition in which chip deformation is significantly reduced, molding sheets for formation of first and second side margin portions were attached to opposite surfaces of the chip to fabricate a multilayer ceramic capacitor green chip having 0603 size (width×depth×height: 0.6 mm×0.3 mm×0.3 mm).

After a fabricated multilayer ceramic capacitor sample was subjected to a firing process in nitrogen ambient at temperature less than 120 degrees Celsius and then fired under a condition in which a hydrogen concentration is less than or equal to 0.5% H2, electrical characteristics were comprehensively confirmed.

In Table (1) below, electrical characteristics of actual multilayer ceramic capacitors (MLCCs) manufactured according to comparative examples and exemplary embodiments are summarized.

TABLE (1)

| | Number of moles of additive per 100 mole of base material BaTiO3 | | | | | | | | |
|---|---|---|---|---|---|---|---|---|---|
| | $MnO_2$ | | $SiO_2$ | | $NaCO_3$ | | $Li_2O$ | | EC |
| Sample | B | M | B | M | B | M | B | M | HTWV |
| *1 | 0.1 | 0.1 | 3.0 | 3.0 | 1.0 | 1.0 | 2.0 | 2.0 | X |
| 2 | 0.1 | 0.5 | 3.0 | 3.0 | 1.0 | 1.0 | 2.0 | 2.0 | O |
| 3 | 0.1 | 1.0 | 3.0 | 3.0 | 1.0 | 1.0 | 2.0 | 2.0 | O |
| 4 | 0.1 | 1.5 | 3.0 | 3.0 | 1.0 | 1.0 | 2.0 | 2.0 | O |
| 5 | 0.1 | 2.0 | 3.0 | 3.0 | 1.0 | 1.0 | 2.0 | 2.0 | O |
| *6 | 0.1 | 1.5 | 3.0 | 2.0 | 1.0 | 1.0 | 2.0 | 2.0 | X |
| *7 | 0.1 | 1.5 | 3.0 | 2.5 | 1.0 | 1.0 | 2.0 | 2.0 | X |
| 8 | 0.1 | 1.5 | 3.0 | 3.5 | 1.0 | 1.0 | 2.0 | 2.0 | O |
| 9 | 0.1 | 1.5 | 3.0 | 4.0 | 1.0 | 1.0 | 2.0 | 2.0 | O |
| *10 | 0.1 | 1.5 | 3.0 | 3.5 | 1.0 | 0.5 | 2.0 | 2.0 | X |
| 11 | 0.1 | 1.5 | 3.0 | 3.5 | 1.0 | 1.5 | 2.0 | 2.0 | O |
| 12 | 0.1 | 1.5 | 3.0 | 3.5 | 1.0 | 2.0 | 2.0 | 2.0 | O |
| *13 | 0.1 | 1.5 | 3.0 | 3.5 | 1.0 | 1.5 | 2.0 | 1.0 | X |
| *14 | 0.1 | 1.5 | 3.0 | 3.5 | 1.0 | 1.5 | 2.0 | 1.5 | X |
| 15 | 0.1 | 1.5 | 3.0 | 3.5 | 1.0 | 1.5 | 2.0 | 2.5 | O |

(B: body,
M: margin portion,
EC: electrical characteristics,
HTWV: high-temperature withstand voltage)
comparative examples,
O: good,
X: poor As can be seen from the Table (1), Comparative Example 1 is a case where a dielectric composition of a body and a dielectric composition of a side margin portion are the same in a sample of a conventional multilayer ceramic capacitor. The Comparative Example 1 shows that there is a problem in characteristics of a high-temperature withstand voltage.

Comparative Examples 6 and 7 are a case where the content of a subcomponent SiO2 included in a side margin portion is lower than that of SiO2 included in a body. The Comparative Examples 6 and 7 show that there is a problem in characteristics of a high-temperature withstand voltage.

Comparative Examples 6 and 7 are a case where the content of a subcomponent SiO2 included in a side margin portion is lower than that of SiO2 included in a body. The Comparative Examples 6 and 7 show that there is a problem in characteristics of a high-temperature withstand voltage.

Comparative Example 10 is a case where the content of a subcomponent NaCO3 included in a side margin portion is lower than that of NaCO3 included in a body. The Comparative Example 10 shows that there is a problem in characteristics of a high-temperature withstand voltage.

Comparative Examples 13 and 14 are a case where the content of a subcomponent LiO2 included in a side margin portion is lower than that of LiO2 included in a body. The Comparative Examples 13 and 14 show that there is a problem in characteristics of a high-temperature withstand voltage.

Meanwhile, Exemplary Embodiments 2 to 5, 8 and 9, 11 and 12, and 15 are cases where the contents of subcomponents MnO2, SiO2, and NaCO3 included in a side margin portion are higher than those of MnO2, SiO2, and NaCO3 included in a body, respectively. The Exemplary Embodiments 2 to 5, 8 and 9, 11 and 12, and 15 show that characteristics of a high-temperature withstand voltage are excellent.

As described above, according to exemplary embodiments in the present disclosure, an internal electrode is entirely formed in a width direction of a ceramic body. However, first and second side margin portions are separately attached after the internal electrode is exposed to a widthwise side surface of a ceramic body. Thus, an overlap area between internal electrodes may be significantly increased to implement a high-capacitance multilayer ceramic capacitor. In addition, since a dielectric constant of first and second side margin portions is lower than that of the ceramic body, an electric field concentrate at an end of the internal electrode may be reduced to prevent and improve reliability.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
    a ceramic body including first and second surfaces opposing each other and third and fourth surfaces connecting the first and second surfaces;
    a plurality of internal electrodes disposed inside the ceramic body and exposed to the first and second surfaces, the plurality of internal electrodes each having one end exposed to the third or fourth surface; and
    first and second side margin portions disposed on sides of the internal electrodes exposed to the first and second surfaces, such that interfaces are defined between the first and second side margin portions and the first and second surfaces, respectively,
    wherein the first and second side margin portions and the ceramic body include a base material main component including barium (Ba) and titanium (Ti) and a subcomponent, and
    wherein the first and second side margin portions comprise at least one of sodium (Na) or lithium (Li) as a subcomponent.

2. The multilayer ceramic capacitor of claim 1, wherein a dielectric composition of the first and second side margin portions is different from a dielectric composition of the ceramic body.

3. The multilayer ceramic capacitor of claim 1, wherein the first and second side margin portions and the ceramic body comprise a first subcomponent including at least one of manganese (Mn), vanadium (V), chromium (Cr), iron (Fe), nickel (Ni), cobalt (Co), copper (Cu), or zinc (Zn) as a subcomponent.

4. The multilayer ceramic capacitor of claim 3, wherein a content of manganese (Mn) included in the first and second side margin portions is higher than a content of manganese (Mn) included in the ceramic body.

5. The multilayer ceramic capacitor of claim 1, wherein a dielectric constant of the first and second side margin portions is lower than a dielectric constant of the ceramic body.

6. The multilayer ceramic capacitor of claim 1, wherein the first and second side margin portions and the ceramic body comprise a second subcomponent including at least one of barium (Ba) or calcium (Ca) as a subcomponent.

7. The multilayer ceramic capacitor of claim 1, wherein the first and second side margin portions and the ceramic body comprise a third subcomponent including silicon (Si)-containing oxide or carbonate or a silicon (Si)-containing glass component as a subcomponent.

8. The multilayer ceramic capacitor of claim 7, wherein the content of silicon (Si) included in the first and second side margin portions is higher than the content of silicon (Si) included in the ceramic body.

9. The multilayer ceramic capacitor of claim 1, wherein the first and second side margin portions and the ceramic body include a fourth subcomponent including at least one of yttrium (Y), dysprosium (Dy), holmium (Ho), erbium (Er), gadolinium (Gd), cerium (Ce), neodymium (Nd), samarium (Sm), lanthanum (La), terbium (Tb), ytterbium (Yb), or praseodymium (Pr) as a subcomponent and a fifth subcomponent including magnesium (Mg) or aluminum (Al) as a subcomponent.

10. The multilayer ceramic capacitor of claim 1, wherein the content of at least one of Na and Li included in the first and second side margin portions is higher than the content of at least one of Na and Li included in the ceramic body.

11. A multilayer ceramic capacitor comprising:
    a ceramic body including first and second surfaces opposing each other and third and fourth surfaces connecting the first and second surfaces;
    plurality of internal electrodes disposed inside the ceramic body and exposed to the first and second surfaces, the plurality of internal electrodes each having one end exposed to the third or fourth surface; and
    first and second side margin portions disposed on sides of the internal electrodes exposed to the first and second surfaces, such that interfaces are defined between the first and second side margin portions and the first and second surfaces, respectively,
    wherein the first and second side margin portions and the ceramic body include a base material main component including barium (Ba) and titanium (Ti) and a subcomponent,
    wherein the first and second side margin portions and the ceramic body include Mn, and
    wherein the first and second side margin portions comprise at least one of sodium (Na) or lithium (Li) as a subcomponent.

12. The multilayer ceramic capacitor of claim 11, wherein the first and second side margin portions and the ceramic body include a first subcomponent including at least one of manganese (Mn), vanadium (V), chromium (Cr), iron (Fe), nickel (Ni), cobalt (Co), copper (Cu), or zinc (Zn) as a subcomponent.

13. The multilayer ceramic capacitor of claim 11, wherein the content of Mn included in the first and second side margin portions is higher than the content of Mn included in the ceramic body.

14. The multilayer ceramic capacitor of claim 11, wherein the first and second side margin portions and the ceramic body include a second subcomponent including at least one of barium (Ba) or calcium (Ca) as a subcomponent, a third subcomponent including a silicon (Si)-containing oxide or carbonate or a silicon (Si)-containing glass component as a subcomponent, a fourth subcomponent including at least one of yttrium (Y), dysprosium (Dy), holmium (Ho), erbium (Er), gadolinium (Gd), cerium (Ce), neodymium (Nd), samarium (Sm), lanthanum (La), terbium (Tb), ytterbium (Yb), or praseodymium (Pr) as a subcomponent, and a fifth subcomponent including magnesium (Mg) or aluminum (Al) as a subcomponent.

15. The multilayer ceramic capacitor of claim 14, wherein the content of silicon (Si) included in the first and second side margin portions is higher than the content of silicon (Si) included in the ceramic body.

16. The multilayer ceramic capacitor of claim 11, wherein the content of at least one of Na or Li included in the first and second side margin portions is higher than the content of at least one of Na or Li included in the ceramic body.

17. The multilayer ceramic capacitor of claim 11, wherein a thickness of the first and second side margin portions is less than or equal to 18 micrometers (μm).

* * * * *